(12) United States Patent
Iwami

(10) Patent No.: US 6,949,610 B2
(45) Date of Patent: Sep. 27, 2005

(54) GOLF BALL

(75) Inventor: Satoshi Iwami, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 127 days.

(21) Appl. No.: 10/419,966

(22) Filed: Apr. 22, 2003

(65) Prior Publication Data

US 2003/0199643 A1 Oct. 23, 2003

(30) Foreign Application Priority Data

Apr. 22, 2002 (JP) .......................................... 2002-119374

(51) Int. Cl.[7] .......................... A63B 37/12; C08L 75/04
(52) U.S. Cl. ...................................... 525/440; 473/378
(58) Field of Search ........................... 525/440; 473/378

(56) References Cited

U.S. PATENT DOCUMENTS

| | | |
|---|---|---|
| 3,395,109 A | 7/1968 | Molitor et al. |
| 3,989,568 A | 11/1976 | Isaac |
| 4,123,061 A | 10/1978 | Dusbiber |
| 4,248,432 A | 2/1981 | Hewitt et al. |
| 4,884,814 A | 12/1989 | Sullivan |
| 5,120,791 A | 6/1992 | Sullivan |
| 5,759,676 A * | 6/1998 | Cavallaro et al. ............ 428/215 |
| 5,929,189 A | 7/1999 | Ichikawa et al. |
| 6,251,991 B1 | 6/2001 | Takesue et al. |
| 6,747,100 B2 * | 6/2004 | Ichikawa et al. ............ 525/440 |
| 6,750,299 B2 * | 6/2004 | Ichikawa et al. ............ 525/440 |

FOREIGN PATENT DOCUMENTS

| | | |
|---|---|---|
| EP | 0 467 622 A1 | 1/1992 |
| GB | 2278364 A | 11/1994 |
| JP | 51-74726 | 6/1976 |
| JP | 600029156 * | 2/1985 |
| JP | 5-3931 A | 1/1993 |
| JP | 06-299052 A | 10/1994 |
| JP | 6-327794 A | 11/1994 |
| JP | 2662909 B2 | 6/1997 |
| JP | 2709950 B2 | 10/1997 |
| JP | 9-271538 A | 10/1997 |
| JP | 11-128402 A | 5/1999 |

* cited by examiner

Primary Examiner—David J. Buttner
(74) Attorney, Agent, or Firm—Birch, Stewart, Kolasch & Birch, LLP

(57) ABSTRACT

The present invention provides a golf ball, which is superior in rebound characteristics, flight distance and scuff resistance. The present invention relates to a golf ball comprising at least one layer of a core and a cover formed on the core, wherein the cover is formed from a cover resin composition mainly comprising a mixture of (a) polyurethane-based thermoplastic elastomer, and
(b) a functional group modified polyester-based thermoplastic elastomer as a base resin.

5 Claims, No Drawings

GOLF BALL

This nonprovisional application claims priority under 35 U.S.C. § 119 (a) on Patent Application Ser. No(s). 2002-119374 filed in JAPAN on Apr. 22, 2002, which is herein incorporated by reference.

FIELD OF THE INVENTION

The present invention relates to a golf ball. More particularly, it relates to a golf ball, which is superior in rebound characteristics, flight distance and scuff resistance.

BACKGROUND OF THE INVENTION

Recently, ionomer resin has been widely used for cover material of golf balls. This is because the ionomer resin is superior in rebound characteristics, durability, processability and the like. However, since the ionomer resin has high rigidity and hardness, there are problems that in the resulting golf ball, shot feel is hard and poor; and spin performance is not sufficiently obtained, which degrades controllability, when using ionomer resin alone as the cover material.

In order to solve the problems, it is attempted to soften the ionomer resin by various means. For example, it is proposed to blend the hard ionomer resin having high rigidity with terpolymer-based soft ionomer resin (Japanese Patent Kokai Publications No. 3931/1993, Japanese Patent No. 2709950 and the like) or blend the hard ionomer resin with thermoplastic elastomer (Japanese Patent Kokai Publications Nos. 299052/1994, 327794/1994 and the like) to soften the cover.

However, when good shot feel and spin performance are accomplished in case of using the blend of the hard ionomer with the soft ionomer resin, rebound characteristics of the resulting golf ball are largely degraded. In addition, since the surface of the cover of the golf ball is easily abraded by grooves on a face surface of the golf club when hit by an iron club, it is problem that the surface of the golf ball becomes fluffy or begins to split finely, and scuff resistance is poor.

When the blend of the hard ionomer with the thermoplastic elastomer is used, rebound characteristics are excellent compared with the blend with the soft ionomer resin, but the compatibility between the both is poor, and scuff resistance when hit by an iron club is poor compared with the blend with the soft ionomer resin.

In order to solve the problems, it has been suggested to use thermosetting polyurethane composition (Japanese Patent Kokai publication No. 74726/1976, Japanese Patent No. 2662909, U.S. Pat. No. 4,123,061 and the like), or polyurethane-based thermoplastic elastomer (U.S. Pat. Nos. 3,395,109, 4,248,432 and the like) as a cover material of golf ball. When the thermosetting polyurethane composition is used for the cover material, the scuff resistance, which is problem from using the blend of the hard ionomer resin with the soft ionomer resin or thermoplastic elastomer, is excellent. However, since a process of coating a cover on a core is complicated, large-scale production is difficult, and the productivity is degraded.

When the polyurethane-based thermoplastic elastomer is used for the cover material, compared with the thermosetting polyurethane composition, the productivity is improved, but the shot feel, controllability and rebound characteristics are not sufficiently obtained. When polyurethane-based thermoplastic elastomer formed by using typical diisocyanates, such as 2,4-tolylene diisocyanate, 2,6-tolylene diisocyanate or a mixture thereof (TDI), 4,4'-diphenylmethane diisocyanate (MDI) and the like, is used for the cover material, its strength is high, and scuff resistance of the resulting golf ball is excellent, but there is problem that yellowing is easy to occur, and it is required to further use white paint. In order to solve the problem, it has been suggested to use polyurethane-based thermoplastic elastomer formed by using aliphatic diisocyanate for the cover material (Japanese Patent Kokai publication No. 271538/1997). However, there is problem that its strength is low, and scuff resistance of the resulting golf ball is degraded, compared with the polyurethane-based thermoplastic elastomer formed by using aromatic diisocyanate.

In order to solve the problem, a golf ball cover stock comprising as a main component a heated mixture consisting essentially of a thermoplastic polyurethane elastomer and a functional group modified polyolefin has been suggested (Japanese Patent Kokai publication No. 128402/1999. The functional group modified polyolefin is used in order to soften the cover and improve the scuff resistance. In addition, the compatibility with the polyurethane-based thermoplastic elastomer is improved by modifying with the functional group. However, there is problem that the rebound characteristics are degraded by using the functional group modified polyolefin.

OBJECTS OF THE INVENTION

A main object of the present invention is to provide a golf ball, which is superior in rebound characteristics, flight distance and scuff resistance.

According to the present invention, the object described above has been accomplished by using a mixture of polyurethane-based thermoplastic elastomer and a functional group modified polyester-based thermoplastic elastomer as a base resin of the cover, thereby providing a golf ball, which is superior in rebound characteristics, flight distance and scuff resistance.

SUMMARY OF THE INVENTION

The present invention relates to a golf ball comprising at least one layer of a core and a cover formed on the core, wherein the cover is formed from a cover resin composition mainly comprising a mixture of (a) polyurethane-based thermoplastic elastomer, and (b) a functional group modified polyester-based thermoplastic elastomer as a base resin.

In order to put the present invention into a more suitable practical application, it is desired that the functional group modified polyester-based thermoplastic elastomer be modified by a functional group selected from the group consisting of isocyanate group, epoxy group, acid group, hydroxyl group and anhydride group;

the functional group modified polyester-based thermoplastic elastomer have a Shore D hardness of not more than 60;

the cover resin composition have a Shore D hardness of 30 to 60, and the cover have a thickness of 0.3 to 2.0 mm; and a weight ratio (a/b) of the polyurethane-based thermoplastic elastomer (a) to the functional group modified polyester-based thermoplastic elastomer (b) be within the range of 60/40 to 95/5.

DETAILED DESCRIPTION OF THE INVENTION

The golf ball of the present invention comprises a core and a cover covering the core. The core is formed from a rubber composition essentially containing a base rubber, a co-crosslinking agent, an organic peroxide, a filler, an antioxidant and the like. The core may have single-layered structure or multi-layered structure, which has two or more layers.

The base rubber used for the core of the present invention may be synthesis rubber, which has been conventionally used for cores of solid golf balls. Preferred is high-cis polybutadiene rubber containing a cis-1,4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.) and the like. When the core has two-layered structure composed of an inner core and an outer core, and the outer core has small thickness, the preferred co-crosslinking agent for the inner core is a zinc salt of α,β-unsaturated carboxylic acid, particularly zinc acrylate because it imparts high rebound characteristics to the resulting golf ball, and the preferred co-crosslinking agent for the outer core is a magnesium salt of α,β-unsaturated carboxylic acid, particularly magnesium methacrylate because it imparts good releasability from a mold to the core. The amount of the co-crosslinking agent is from 15 to 45 parts by weight, preferably from 25 to 40 parts by weight, based on 100 parts by weight of the base rubber. When the amount of the co-crosslinking agent is smaller than 15 parts by weight, the core is too soft, and the rebound characteristics of the resulting golf ball are degraded, which reduces the flight distance. On the other hand, when the amount of the co-crosslinking agent is larger than 45 parts by weight, the core is too hard, and the shot feel of the resulting golf ball is poor.

The organic peroxide, which acts as a crosslinking agent or hardener, includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.05 to 3 parts by weight, preferably 0.1 to 1.5 parts by weight, based on 100 parts by weight of the base rubber. When the amount of the organic peroxide is smaller than 0.05 parts by weight, the core is too soft, and the rebound characteristics of the resulting golf ball are degraded, which reduces the flight distance. On the other hand, when the amount of the organic peroxide is larger than 3 parts by weight, the core is too hard, and the shot feel of the resulting golf ball is poor.

The filler, which can be typically used for the core of solid golf ball, includes for example, inorganic filler (such as zinc oxide, barium sulfate, calcium carbonate and the like), high specific gravity metal powder filler (such as tungsten powder, molybdenum powder and the like), and the mixture thereof. The amount of the filler is from 1 to 30 parts by weight, preferably from 5 to 20 parts by weight, based on 100 parts by weight of the base rubber. When the amount of the filler is smaller than 1 parts by weight, it is difficult to adjust the proper weight of the resulting golf ball. On the other hand, when the amount of the filler is larger than 30 parts by weight, the weight ratio of the rubber component in the core is small, and the rebound characteristics reduce too much.

The rubber compositions for the core of the golf ball of the present invention can contain other components, which have been conventionally used for preparing the core of solid golf balls, such as organic sulfide compound, antioxidant and the like. If used, the amount of the organic sulfide compound is preferably 0.2 to 5.0 parts by weight, based on 100 parts by weight of the base rubber.

The core of the golf ball of the present invention can be obtained by mixing the rubber composition, and then press-molding and vulcanizing the mixture under applied heat in a mold. The vulcanizing, of which the condition is not limited, is conducted at 130 to 180° C. and 2.9 to 11.8 MPa for 10 to 40 minutes.

When the core has multi-layered structure, such as two-layered structure composed of the inner core and outer core, the both layer are preferably formed from the above rubber composition, but a material for the outer core is not limited as long as it has the above properties. That is, the outer core may be formed from the above rubber composition comprising cis-1,4-polybutadiene as a base rubber, or from thermoplastic resin, such as ionomer resin, thermoplastic elastomer or mixture thereof.

In the golf ball of the present invention, it is suitable for the core to have a diameter of 38.8 to 42.2 mm, preferably 39.6 to 41.8 mm, more preferably 40.0 to 41.2 mm. When the diameter of the core is smaller than 38.8 mm, the cover is too thick, and the rebound characteristics of the resulting golf ball are degraded. On the other hand, when the diameter is larger than 42.2 mm, the thickness of the cover is too thin, and it is difficult to mold it. In addition, the technical effects accomplished by the presence of the cover are nor sufficiently obtained.

In the golf ball of the present invention, it is desired for the core to have a deformation amount when applying from an initial load of 98 N to a final load of 1275 N of 2.5 to 3.5 mm, preferably 2.6 to 3.2 mm, more preferably 2.6 to 3.0 mm. When the deformation amount is smaller than 2.5 mm, the core is too hard, and the shot feel of the resulting golf ball is poor. In addition, the spin amount is large, and the flight distance is degraded. On the other hand, when the deformation amount is larger than 3.5 mm, the deformation amount of the core at the time of hitting is too large, and the shot feel of the resulting golf ball is heavy and poor. In addition, the rebound characteristics of the resulting golf ball are degraded.

In the golf ball of the present invention, if the core has multi-layered structure, such as two-layered structure composed of an inner core and an outer core, it is desired that the diameter and deformation amount of the resulting two-layered core be within the above ranges. A method of producing the two-layered core is not specifically limited, but may be a conventional method. The spherical inner core can be obtained by mixing the rubber composition for the inner core, and then press-molding and vulcanizing the mixture at the above vulcanization condition in a mold. The two-layered core, which is formed by covering the outer core on the inner core, can be obtained by mixing the rubber composition for the outer core is mixed, coating the mixture on the inner core into a concentric sphere, and then press-molding at 160 to 180° C. for 10 to 20 minutes in the mold.

When the core has two-layered structure composed of an inner core and an outer core, the thickness of the outer core is determined by specifying the diameter of the inner core and that of the two-layered core, but it is desired for the outer core to have a thickness of 0.5 to 4.0 mm, preferably 0.8 to 3.5 mm, more preferably 1.0 to 3.0 mm. When the thickness of the outer core is smaller than 0.5 mm, it is difficult to mold it. On the other hand, when the thickness of the outer core is larger than 4.0 mm, the outer core is too thick in order to accomplishing the hardness distribution such that the outer portion is hard and the inner portion is soft, and the shot feel is hard and poor.

The cover is then covered on the core. In the golf ball of the present invention, it is required for the cover to be formed from a cover resin composition mainly comprising a mixture of (a) polyurethane-based thermoplastic elastomer, and (b) a functional group modified polyester-based thermoplastic elastomer as a base resin. The wording "mainly comprising the mixture" as used herein means that the amount (a+b) of the mixture is not less than 50% by weight, preferably 80% by weight, more preferably 90% by weight.

In the golf ball of the present invention, the polyurethane-based thermoplastic elastomer as the component (a) comprising a base resin for a cover composition generally contains polyurethane structure as hard segment and polymeric polyol compound such as polyester polyol or polyether polyol as soft segment. The polyurethane structure generally contains diisocyanate and chain extender (such as polyvalent alcohol, amine-based chain extender). The polymeric polyol compound and chain extender are not limited, but may be compounds, which have been generally used for polyurethane-based thermoplastic elastomer.

Examples of the polyol compounds are not limited, but include polyester-based polyol, polyether-based polyol, copolyester-based polyol, polycarbonate-based polyol and the like. Concrete examples of the polyester-based polyols include polycaprolactone glycol, poly(ethylene-1,4-adipate) glycol, poly(butylene-1,4-adipate) glycol and the like. Concrete examples of the polyether-based polyols include polyoxytetramethylene glycol and the like. Concrete examples of the copolyester-based polyols include poly(diethylene glycol adipate) glycol and the like. Concrete examples of the polycarbonate-based polyols include (hexanediol-1,6-carbonate) glycol and the like. It is desired for the polyol compound to have a number average molecular weight of about 600 to 5,000, preferably 1,000 to 3,000.

Examples of the diisocyanates are not limited, but include aromatic diisocyanates, such as tolylene diisocyanate (TDI), diphenylmethane diisocyanate (MDI), tolidine diisocyanate (TODI) and naphthalene diisocyanate (NDI); aliphatic diisocyanates, such as hexamethylene diisocyanate (HDI), 2,2,4(2,4,4)-trimethylhexamethylene diisocyanate (TMDI) and lysine diisocyanate (LDI); cycloaliphatic diisocyanates, such as 4,4'-dicyclohexylmethane diisocyanate ($H_{12}$MDI), isophorone diisocyanate (IPDI), 1,3-bis(isocyanatomethyl) cyclohexane diisocyanate ($H_6$XDI) and trans-1,4-cyclohexane diisocyanate (CHDI); and the like. Preferred are HDI, $H_{12}$MDI, $H_6$XDI and CHDI in view of yellowing resistance.

Examples of the chain extenders include polyvalent alcohols, amines and the like, which have been generally used for polyurethane-based thermoplastic elastomer, such as 1,4-butylene glycol, 1,2-ethylene glycol, 1,3-propylene glycol, 1,6-hexyl glycol, 1,3-butylene glycol, dicyclohexylmethylmethanediamine (hydrogenated MDA), isophorone diamine (IPDA) and the like.

In the golf ball of the present invention, the base resin of the cover is used by mixing the functional group modified polyester-based thermoplastic elastomer as the component (b) with the polyurethane-based thermoplastic elastomer as the component (a). The soft polyester-based thermoplastic elastomer having excellent rebound characteristics is added to the polyurethane-based thermoplastic elastomer to soften the cover material and improve the rebound characteristics. In addition, the polyester-based thermoplastic elastomer is functional group modified to improve the compatibility with the polyurethane-based thermoplastic elastomer as the component (a), and the scuff resistance described above can be improved.

Examples of the polyester-based thermoplastic elastomers include polyester ether-based thermoplastic elastomer, which is copolymer containing aromatic polyester polymeric unit as hard segment and aliphatic polyether polymeric unit as soft segment; polyester ester-based thermoplastic elastomer, which is copolymer containing aromatic polyester polymeric unit as hard segment and aliphatic polyester polymeric unit as soft segment; and the like. Concrete examples thereof include "Perprene (trade name)" commercially available from Toyobo Co., Ltd., "Hytrel (trade name)" commercially available from Toray-Do Pont Co., Ltd. and the like.

The functional group modified polyester-based thermoplastic elastomer as the component (b) is preferably the above polyester-based thermoplastic elastomer modified by a functional group selected from the group consisting of isocyanate group, epoxy group, acid group, hydroxyl group and anhydride group. Preferred are polyester-based thermoplastic elastomers modified by isocyanate group and epoxy group in view of the compatibility with the polyurethane-based thermoplastic elastomer.

It is desired that a weight ratio (a/b) of the polyurethane-based thermoplastic elastomer (a) to the functional group modified polyester-based thermoplastic elastomer (b) be within the range of 60/40 to 95/5, preferably 70/30 to 95/5, more preferably 70/30 to 90/10. When the amount of the polyurethane-based thermoplastic elastomer (a) is smaller than 60% by weight, the scuff resistance of the resulting golf ball is degraded. On the other hand, when the amount of the polyurethane-based thermoplastic elastomer (a) is larger than 95% by weight, the technical effects accomplished by the presence of the functional group modified polyester-based thermoplastic elastomer (b) are not sufficiently obtained.

It is desired for the polyurethane-based thermoplastic elastomer (a) to have a hardness in Shore D hardness of 30 to 60, preferably 35 to 55, more preferably 38 to 50, most preferably 38 to 48. When the hardness of the polyurethane-based thermoplastic elastomer is lower than 30, the cover is too soft, and the rebound characteristics of the resulting golf ball are degraded. On the other hand, when the hardness of the polyurethane-based thermoplastic elastomer (a) is higher than 60, the cover is too hard, and the desired spin amount of the resulting golf ball is not obtained.

It is desired for the functional group modified polyester-based thermoplastic elastomer (b) to have a hardness in Shore D hardness of not more than 60, preferably 10 to 55, more preferably 15 to 52. When the hardness of the functional group modified polyester-based thermoplastic elastomer is higher than 55, it is difficult to soften the cover. On the other hand, when the hardness is lower than 10, it is too soft, and it is difficult to prepare as a cover material.

In the golf ball of the present invention, the cover resin composition may optionally contain pigments (such as titanium dioxide, etc.) and the other additives such as a dispersant, an antioxidant, a UV absorber, a photostabilizer and a fluorescent agent or a fluorescent brightener, etc., in addition to the above resin component as long as the addition of the additives does not deteriorate the desired performance of the golf ball cover. If used, the amount of the pigment is preferably 0.1 to 5 parts by weight, based on 100 parts by weight of the resin component for the cover.

A method of covering on the core with the cover is not specifically limited, but may be a conventional method. For example, there can be used a method comprising molding the cover composition into a semi-spherical half-shell in advance, covering the core with the two half-shells, followed by press molding at 160 to 200° C. for 1 to 10 minutes, or a method comprising injection molding the cover composition directly on the core, which is covered with the cover, to cover it. Preferred is the method comprising injection molding in view of the moldability of the cover.

In the golf ball of the present invention, it is desired for the cover to have a thickness of 0.3 to 2.0 mm, preferably 0.5 to 1.6 mm, more preferably 0.8 to 1.4 mm. When the thickness is smaller than 0.3 mm, the cover is too thin, and it is difficult to mold it. In addition, the technical effects accomplished by the presence of the cover are not sufficiently obtained. On the other hand, when the thickness is larger than 2.0 mm, the cover is too thick, and the rebound characteristics of the resulting golf ball are degraded, which reduces the flight distance.

In the golf ball of the present invention, it is desired for the cover resin composition to have a Shore D hardness of 30 to 60, preferably 35 to 55, more preferably 38 to 52. When the hardness is lower than 30, the rebound characteristics are degraded, which reduces the flight distance. On the other hand, when the hardness is higher than 60, the durability is poor. The term "a hardness of the cover resin composition" as used herein refers to the hardness (slab hardness) measured using a sample of a heat and press molded sheets from the cover composition.

At the time of molding the cover, many depressions called "dimples" may be formed on the surface of the golf ball. Furthermore, paint finishing or marking with a stamp may be optionally provided after the cover is molded for commercial purposes.

In the golf ball of the present invention, it is desired to have a deformation amount when applying from an initial load of 98 N to a final load of 1275 N of 2.5 to 3.3 mm, preferably 2.6 to 3.2 mm, more preferably 2.7 to 3.1 mm. When the deformation amount is smaller than 2.5 mm, the shot feel is hard and poor. On the other hand, when the deformation amount is larger than 3.3 mm, the deformation amount at the time of hitting is too large, and the shot feel is heavy and poor.

The golf ball of the present invention is formed, so that it has a diameter of not less than 42.67 mm (preferably 42.67 to 43 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter. In addition, the golf ball of the present invention has a weight of 44 to 46 g, preferably 45.00 to 45.93 g.

EXAMPLES

The following Examples and Comparative Examples further illustrate the present invention in detail but are not to be construed to limit the scope of the present invention.

Production of Core (Cores I and II) Single-Layer Structured Core

The rubber composition for the core having the formulation shown in Table 1 was mixed, and then vulcanized by press-molding in the mold at 170° C. for 15 minutes to obtain spherical core having a diameter shown in the same Table.

(Core III) Two-Layer Structured Core (i) Production of Inner Core

The rubber composition for the inner core having the formulation shown in Table 1 was mixed, and then vulcanized by press-molding in the mold at 170° C. for 15 minutes to obtain spherical core having a diameter shown in the same Table.

(ii) Production of Two-Layer Structured Core

The rubber composition for the outer core having the formulation shown in Table 1 was mixed, and coated on the inner core produced in the step (i) into a concentric sphere, and then vulcanized by press-molding in the mold at 170° C. for 15 minutes to obtain two-layer structured core having a diameter shown in the same Table.

The deformation amount, center hardness (c) and surface hardness (d) of the resulting core was measured, and the hardness difference (d−c) was determined by calculating from the above values of (c) and (d). The results are shown in the same Table.

TABLE 1

| Core | | I | II | III |
|---|---|---|---|---|
| (Inner core composition) | | | | |
| BR-18 | *1 | 100 | 100 | 100 |
| Zinc acrylate | | 33.0 | 33.0 | 31.5 |
| Zinc oxide | | 12.0 | 11.5 | 12.5 |
| Dicumyl peroxide | *2 | 1.0 | 1.0 | 0.8 |
| Diphenyl disulfide | *3 | 0.5 | 0.5 | 0.5 |
| Diameter of inner core (mm) | | — | — | 33.5 |
| (Outer core composition) | | | | |
| BR-18 | *1 | — | — | 100 |
| Zinc acrylate | | — | — | 41.0 |
| Zinc oxide | | — | — | 5.0 |
| Dicumyl peroxide | *2 | — | — | 0.7 |
| Diphenyl disulfide | *3 | — | — | 0.5 |
| Diameter of core (mm) | | 40.0 | 41.2 | 41.2 |
| Hardness difference (d − c) (Shore D) | | 18 | 21 | 26 |
| Core deformation amount (mm) | | 2.85 | 2.75 | 2.80 |

*1: High-cis polybutadiene commercially available from JSR Co., Ltd., under the trade name "BR-18" (Content of cis-1,4-polybutadiene = 96%)
*2: Dicumyl peroxide, commercially available from Nippon Oil & Fats Co., Ltd. under the trade name of "Percumyl D"
*3: Diphenyl disulfide commercially available from Sumitomo Seika Co., Ltd.

Preparation of Cover Compositions

The formulation materials for the cover showed in Tables 2 and 3 were mixed using a kneading type twin-screw extruder to obtain pelletized cover compositions. The extrusion condition was, a screw diameter of 45 mm, a screw speed of 200 rpm, a screw L/D of 35.

The formulation materials were heated at 200 to 260° C. at the die position of the extruder. The hardness were determined, using a sample of a stack of the three or more heat and press molded sheets having a thickness of about 2 mm from the cover composition, which had been stored at 23° C. for 2 weeks, with a Shore D hardness meter according to ASTM D 2240. The results are shown as cover hardness (slab hardness) in Tables 2 to 5. The test method is as described later.

TABLE 2

| Cover composition | | A | B | C | D | E |
|---|---|---|---|---|---|---|
| | | (parts by weight) | | | | |
| Elastollan XNY97A | *4 | 70 | 80 | — | — | 40 |
| Elastollan ET895 | *5 | — | — | 80 | — | — |
| Pandex T-7890 | *6 | — | — | — | — | — |
| $H_{12}$MDI-PTMG | *7 | — | — | — | — | 40 |
| Functional group modified polyester-based elastomer-1 | *8 | 30 | 20 | 20 | 10 | 20 |
| Functional group modified polyester-based elastomer-2 | *9 | — | — | — | — | — |
| Perprene P20-30B | *10 | — | — | — | — | — |
| Functional group modified polyolefin | *11 | — | — | — | — | — |
| Titanium dioxide | | 4 | 4 | 4 | 4 | 4 |
| Cover hardness (Shore D) | | 38 | 42 | 43 | 40 | 48 |

TABLE 3

| Cover composition | | F | G | H | J | K |
|---|---|---|---|---|---|---|
| | | (parts by weight) | | | | |
| Elastollan XNY97A | *4 | 80 | 100 | 80 | 50 | — |
| Elastollan ET895 | *5 | — | — | — | — | — |
| Pandex T-7890 | *6 | — | — | — | — | 90 |
| $H_{12}$MDT-PTMG | *7 | — | — | — | — | — |
| Functional group modified polyester-based elastomer-1 | *8 | — | — | — | — | — |
| Functional group modified polyester-based elastomer-2 | *9 | — | — | 20 | 50 | — |
| Perprene P20-30B | *10 | 20 | — | — | — | — |
| Functional group modified polyolefin | *11 | — | — | — | — | 10 |
| Titanium dioxide | | 4 | 4 | 4 | 4 | 4 |
| Cover hardness (Shore D) | | 40 | 48 | 48 | 50 | 48 |

*4: Elastollan XNY97A (trade name), polyurethane-based thermoplastic elastomer formed by using 4,4'-dicyclohexylmethane diisocyanate ($H_{12}$MDI) (=hydrogenated MDI) and polyoxytetramethylene glycol (PTMG), commercially available from BASF Japan Co., Ltd., JIS-A hardness: 97
*5: Elastollan ET895 (trade name), polyurethane-based thermoplastic elastomer formed by using 4,4'-diphenylmethane diisocyanate (MDI), commercially available from BASF Japan Co., Ltd., JIS-A hardness: 95
*6: Pandex T-7890 (trade name), polyurethane-based thermoplastic elastomer formed by using hexamethylene diisocyanate (HDI), commercially available from DIC Bayer Co., Ltd., JIS-A hardness: 90
*7: $H_{12}$MDI-PTMG polyurethane-based thermoplastic elastomer, commercially available from BASF Japan Co., Ltd., Shore D hardness: 64
*8: Isocyanate modified polyester-based thermoplastic elastomer commercially available from Toyobo Co., Ltd., Shore D hardness: 15
*9: Isocyanate modified polyester-based thermoplastic elastomer commercially available from Toyobo Co., Ltd., Shore D hardness: 52
*10: Perprene P20-30B (trade name), polyester-based thermoplastic elastomer commercially available from Toyobo Co., Ltd., Shore D hardness: 12
*11: Elvaloy EP4051 (trade name), functional group (epoxy group)-modified polyester-based thermoplastic elastomer commercially available from Du Pont-Mitsui Co., Ltd., Shore A hardness: 60

Examples 1 to 9 and Comparative Examples 1 to 4

The cover composition was injection molded to obtain semi-spherical half-shell for the cover. The core obtained as described above was covered with the two semi-spherical half-shells for the cover and then press-molded in the mold at 170° C. for 2 minutes to form a cover layer having a thickness shown in Table 4 (Examples) and Table 5 (Examples and Comparative Examples). The molded article was removed from the mold, and then clear paint was coated on the surface of the cover layer after deflashing to obtain a golf ball having a diameter of 42.8 mm and a weight of 45.4 g. With respect to the resulting golf balls, the deformation amount, coefficient of restitution, flight distance and scuff resistance were measured or evaluated. The results are shown in the same Tables. The test methods are as follows.

Test Methods (1) Deformation Amount

The deformation amount was determined by measuring a deformation amount, when applying from an initial load of 98 N to a final load of 1275 N on the core or golf ball.

(2) Cover Hardness (Slab Hardness)

The cover hardness was determined by measuring a Shore D hardness, using a sample of a stack of the three or more heat and press molded sheets having a thickness of about 2 mm from the cover composition, which had been stored at 23° C. for 2 weeks. The Shore D hardness was measured by using an automatic rubber hardness tester (type LA1), which is commercially available from Kobunshi Keiki Co., Ltd., with a Shore D hardness meter according to ASTM D 2240.

(3) Coefficient of Restitution

An aluminum cylinder having a weight of 200 g was struck at a speed of 45 m/sec against a golf ball, and the velocity of the cylinder and the golf ball after the strike were measured. The coefficient of restitution of the golf ball was calculated from the velocity and the weight of both the cylinder and golf ball before and after strike. The measurement was conducted 5 times for each golf ball (n=5), and the average is indicated by an index when that of Example 3 is 100 as the result of the golf ball.

(4) Flight Distance

A No. 1 wood club (W#1, a driver) commercially available was mounted to a swing robot manufactured by True Temper Co. and the resulting golf ball was hit at a head speed of 40 m/second, flight distance was measured. As the flight distance, total that is a distance to the stop point of the hit golf ball was measured. The measurement was conducted 5 times for each golf ball (n=5), and the average is indicated by an index when that of Example 3 is 100 as the result of the golf ball.

(5) Scuff Resistance

After a pitching wedge (PW) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria o: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

Test Results

TABLE 4

| Test item | Example No. | | | | | |
|---|---|---|---|---|---|---|
| | 1 | 2 | 3 | 4 | 5 | 6 |
| (Core) | | | | | | |
| Type | I | II | III | III | III | III |
| Deformation amount (mm) | 2.85 | 2.75 | 2.80 | 2.80 | 2.80 | 2.80 |
| Diameter (mm) | 40.0 | 41.2 | 41.2 | 41.2 | 41.2 | 41.2 |
| (Cover) | | | | | | |
| Type | B | B | A | B | C | D |
| Hardness | 42 | 42 | 38 | 42 | 43 | 40 |
| Thickness (mm) | 1.4 | 0.8 | 0.8 | 0.8 | 0.8 | 0.8 |
| (Golf ball) | | | | | | |
| Deformation amount (mm) | 2.80 | 2.70 | 2.79 | 2.75 | 2.72 | 2.76 |
| Coefficient of restitution | 100 | 101 | 100 | 101 | 102 | 101 |
| Flight distance | 100 | 101 | 100 | 101 | 101 | 100 |
| Scuff resistance | ○ | ○ | ○ | ○ | ○ | ○ |

TABLE 5

| Test item | Example No. | | | Comparative Example No. | | | |
|---|---|---|---|---|---|---|---|
| | 7 | 8 | 9 | 1 | 2 | 3 | 4 |
| (Core) | | | | | | | |
| Type | III | III | III | I | III | III | III |
| Deformation amount (mm) | 2.80 | 2.80 | 2.80 | 2.85 | 2.80 | 2.80 | 2.80 |
| Diameter (mm) | 41.2 | 41.2 | 41.2 | 40.0 | 41.2 | 41.2 | 41.2 |
| (Cover) | | | | | | | |
| Type | E | H | J | F | F | G | K |
| Hardness | 48 | 48 | 50 | 40 | 40 | 48 | 48 |
| Thickness (mm) | 0.8 | 0.8 | 0.8 | 1.4 | 0.8 | 0.8 | 0.8 |
| (Golfball) | | | | | | | |
| Deformation amount (mm) | 2.68 | 2.70 | 2.63 | 2.75 | 2.74 | 2.67 | 2.67 |
| Coefficient of restitution | 103 | 103 | 100 | 97 | 98 | 99 | 99 |
| Flight distance | 102 | 102 | 100 | 97 | 98 | 99 | 99 |
| Scuff resistance | ○ | ○ | Δ | x | x | x | x |

As is apparent from the results of Tables 4 to 5, the golf balls of the present invention of Examples 1 to 9, when compared with the golf balls of Comparative Examples 1 to 4, are superior in rebound characteristics, flight distance and scuff resistance.

On the other hand, in the golf balls of Comparative Examples 1 and 2, since the mixture of polyurethane-based thermoplastic elastomer and functional group free polyester-based thermoplastic elastomer is used as the base resin for the cover, the deformation amount of the golf ball is large, but the coefficient of restitution is small, which reduces the flight distance. In addition, the scuff resistance is poor.

In the golf ball of Comparative Example 3, since the polyurethane-based thermoplastic elastomer is only used as the base resin for the cover, the coefficient of restitution is small, which reduces the flight distance. In addition, the scuff resistance is poor.

In the golf ball of Comparative Example 4, since the mixture of polyurethane-based thermoplastic elastomer and functional group (epoxy group) modified polyolefin is used as the base resin for the cover, the coefficient of restitution is small, which reduces the flight distance. In addition, the scuff resistance is poor.

What is claimed is:

1. A golf ball comprising at least one layer of a core and a cover formed on the core, wherein the cover is formed from a cover resin composition mainly comprising a mixture of
   (a) polyurethane-based thermoplastic elastomer, and
   (b) a functional group modified polyester-based thermoplastic elastomer
as a base resin.

2. The golf ball according to claim 1, wherein the functional group modified polyester-based thermoplastic elastomer is modified by a functional group selected from the group consisting of isocyanate group, epoxy group, acid group, hydroxyl group and anhydride group.

3. The golf ball according to claim 1, wherein the functional group modified polyester-based thermoplastic elastomer has a Shore D hardness of not more than 60.

4. The golf ball according to claim 1, wherein the cover resin composition has a Shore D hardness of 30 to 60, and the cover has a thickness of 0.3 to 2.0 mm.

5. The golf ball according to claim 1, wherein a weight ratio (a/b) of the polyurethane-based thermoplastic elastomer (a) to the functional group modified polyester-based thermoplastic elastomer (b) is within the range of 60/40 to 95/5.

* * * * *